E. T. POLLARD.
STONE SAWING MACHINE.
APPLICATION FILED OCT. 28, 1910.
1,016,440.
Patented Feb. 6, 1912.
6 SHEETS—SHEET 1.
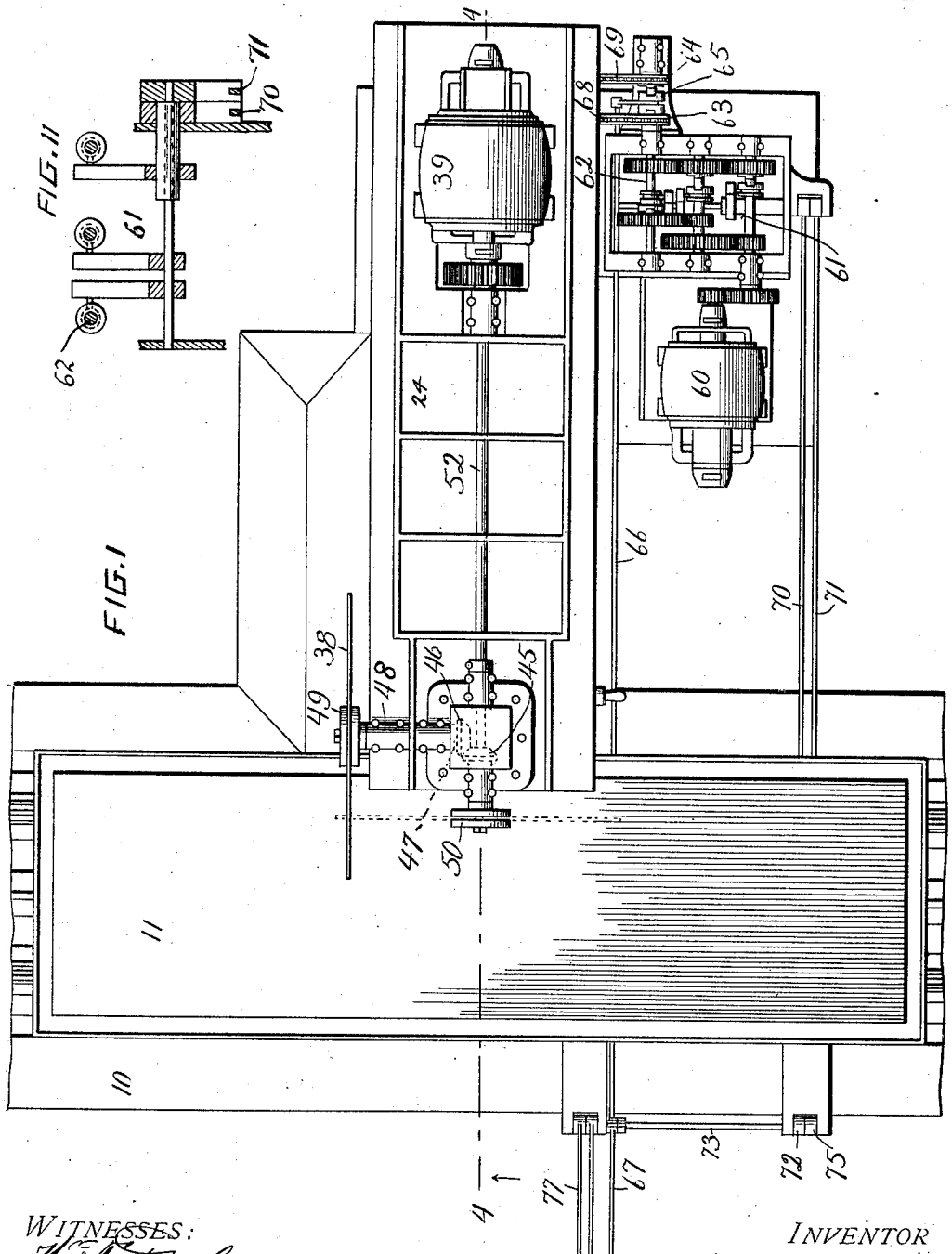
WITNESSES:
INVENTOR
Edson T. Pollard.
BY
Attorney

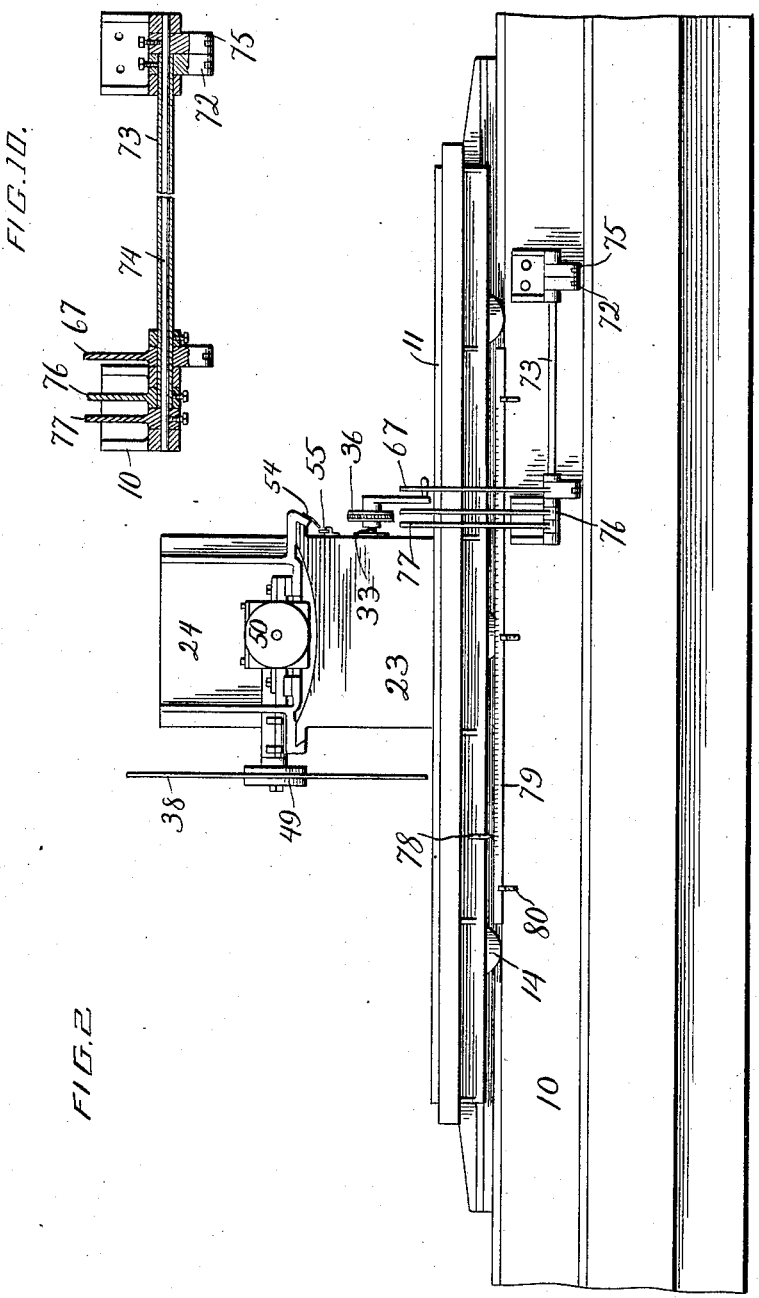

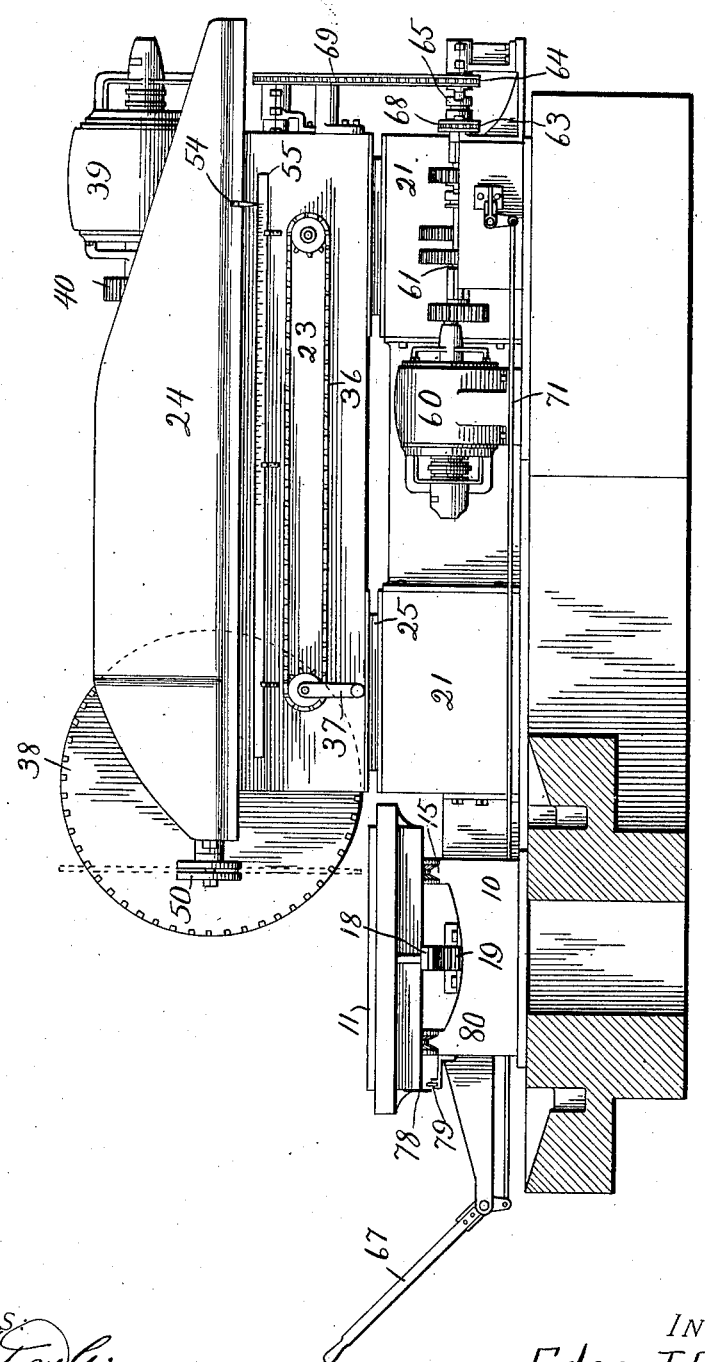

E. T. POLLARD.
STONE SAWING MACHINE.
APPLICATION FILED OCT. 28, 1910.
1,016,440.
Patented Feb. 6, 1912.
6 SHEETS—SHEET 4.
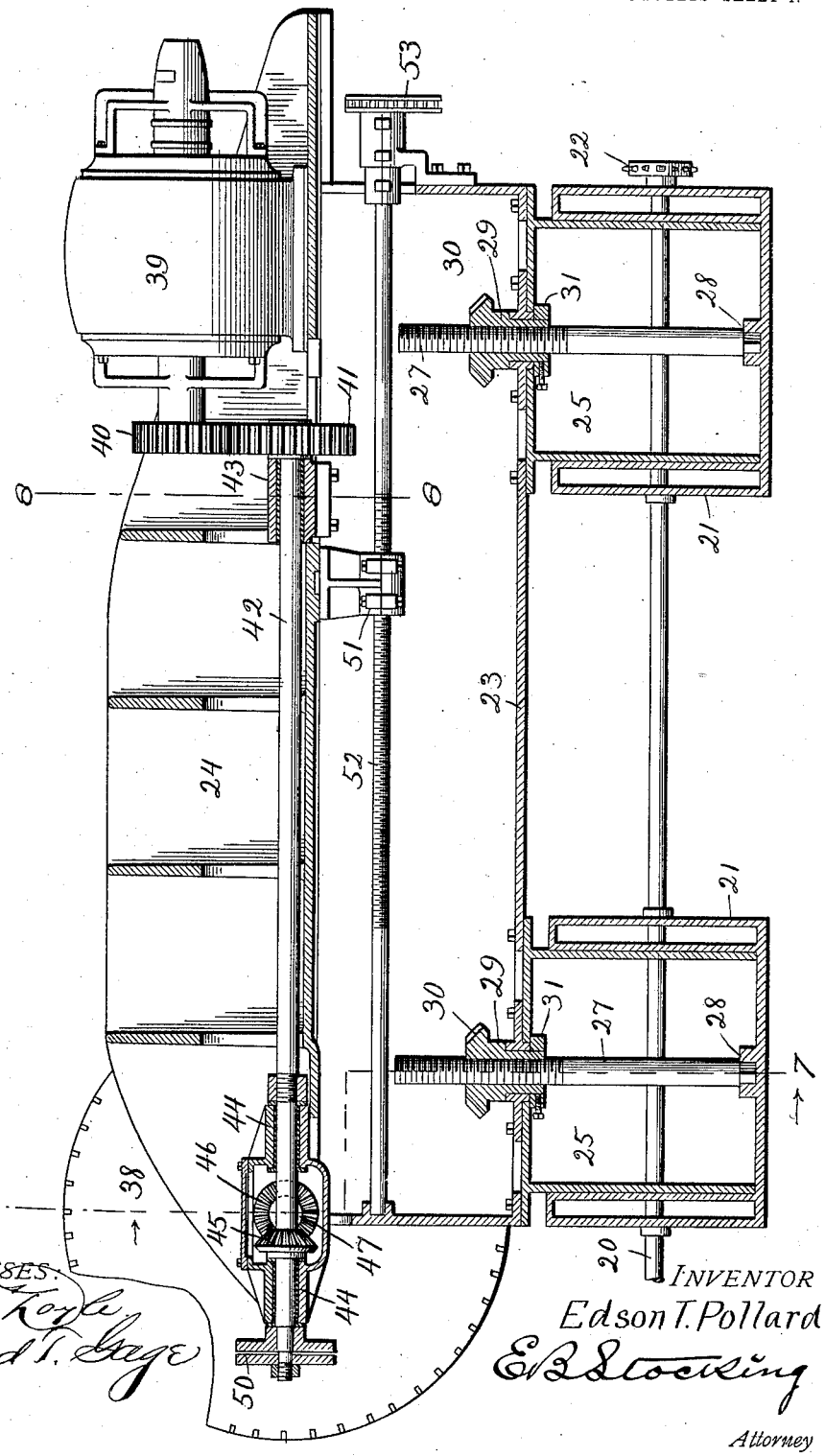

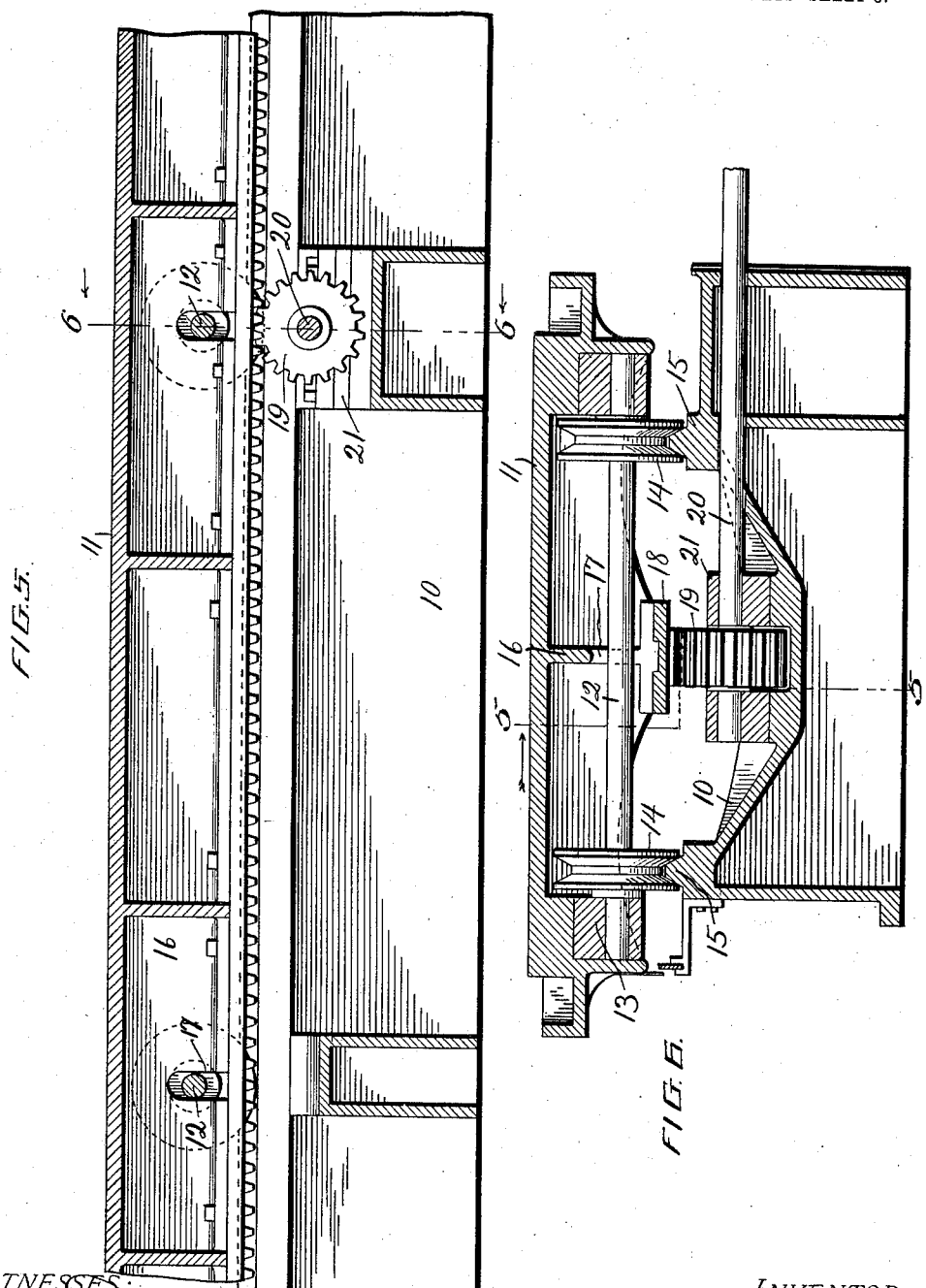

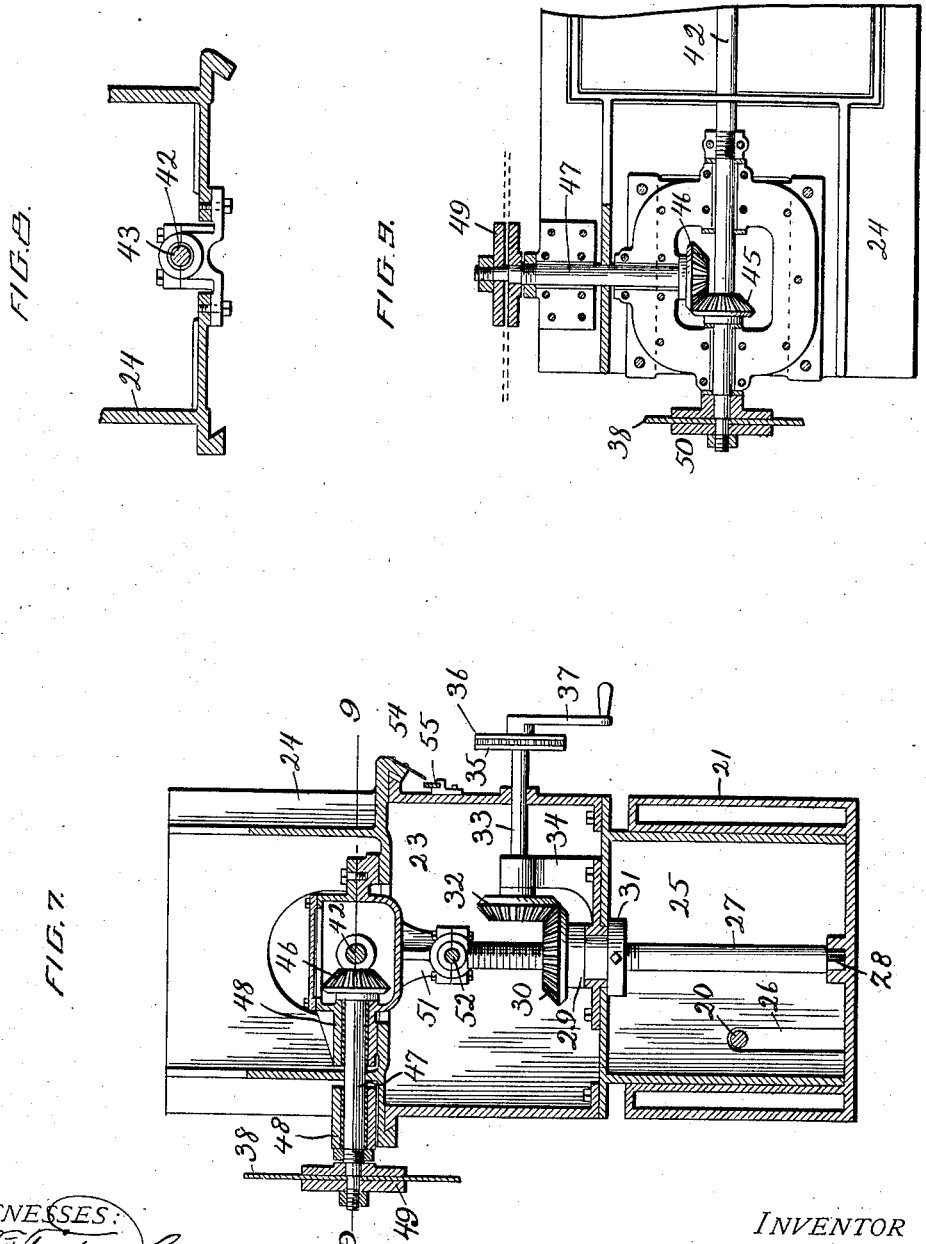

UNITED STATES PATENT OFFICE.

EDSON T. POLLARD, OF RUTLAND, VERMONT.

STONE-SAWING MACHINE.

1,016,440. Specification of Letters Patent. Patented Feb. 6, 1912.

Application filed October 28, 1910. Serial No. 589,575.

*To all whom it may concern:*

Be it known that I, EDSON T. POLLARD, a citizen of the United States, residing at Rutland, county of Rutland, State of Vermont, have invented certain new and useful Improvements in Stone-Sawing Machines, of which the following is a specification, reference being had therein to the accompanying drawing.

This invention relates to a stone sawing machine and particularly to a construction embodying a movable platen and coöperating saw disposed at one side thereof.

The invention has for an object to provide a novel and improved construction wherein the saw is adapted for use either for ripping purposes in the longitudinal movement of the platen or for cross-cutting by a travel of the saw when the platen is at rest.

A further object of the invention is to provide a novel mounting for the saw by which it may be adjusted in a vertical plane relative to the travel of the platen upon which the material is carried or may be moved transversely of such material.

A further object of the invention is to provide a novel construction embodying a platen adjustable longitudinally in combination with a saw carriage mounted to traverse the path of travel of the platen when at rest.

Other and further objects and advantages of the invention will be hereinafter set forth and the novel features thereof defined by the appended claims.

In the drawings—Figure 1 is a plan of the invention; Fig. 2 is a side elevation thereof; Fig. 3 is an end elevation from the right of Fig. 1; Fig. 4 is an enlarged vertical section on line 4—4 of Fig. 1; Fig. 5 is a longitudinal section on line 5—5 of Fig. 6; Fig. 6 is a cross section on line 6—6 of Fig. 5; Fig. 7 is a similar section on line 7—7 of Fig. 4; Fig. 8 is a detail section on line 8—8 of Fig. 4; Fig. 9 is a horizontal section on line 9—9 of Fig. 7; Fig. 10 is a detail vertical section through the clutch adjusting levers and connections, and Fig. 11 is a detail vertical section through the power controlling mechanism.

Like numerals of reference refer to like parts in the several figures of the drawings.

The numeral 10 indicates the base of the machine upon which the platen 11 is mounted to travel in the usual manner. For this purpose, a shaft 12 is mounted in bearings 13 upon the platen and provided with wheels 14 adapted to travel upon the tracks 15 carried by the upper face of the base 10. At the central portion of the platen, a rib 16 depends from the under face thereof and is slotted at 17 to embrace the shaft 12. This rib carries at its lower end a rack bar 18 which engages with a pinion 19 carried by a driving shaft 20 mounted in a bearing 21 upon the base 10. This shaft 20 extends transversely of the platen and through a carriage base 21. It is provided at its free end with a driving connection 22 to which power is applied as will be hereinafter described.

Above the carriage base, is a support 23 upon which the saw carriage 24 is slidingly mounted as shown in Fig. 7. This support is provided with depending portions 25 seated within the carriage base 21 to slide vertically therein. The portions 25 are provided with a vertical slot 26 to allow movement over the platen driving shaft 20. Within the carriage base, vertically disposed screw shafts 27 are mounted against rotation as shown at 28 and threaded thereon is a gear collar 29 provided with a beveled gear 30. This collar is pivotally mounted in the lower portion of the support 23 and held against vertical movement independent thereof by the set collar 31 as shown in Figs. 4 and 7. The gear 30 may be actuated by any desired connections, for instance the coöperating gear 32 carried by the shaft 33 mounted in the bracket 34 and carrying a sprocket wheel 35 from which a driving chain 36 extends to the opposite end of the carriage to operate a similar raising connection. One of the shafts 33 is shown as provided with an operating lever 37. By this means, the support 23 carrying the saw carriage may be adjusted vertically to any desired extent.

For the purpose of driving the saw 38 in either position, for ripping or cross cutting, the motor 39 is mounted upon the carriage 24 and the shaft thereof provided with a gear 40 meshing with a gear 41 upon the saw driving shaft 42 which extends longitudinally of the carriage 24 and is mounted in suitable bearings 43 and 44. This shaft is provided with a beveled gear 45 meshing with a coöperating gear 46 carried by the countershaft 47 which is mounted in bearings 48 and extends transversely of the driving shaft and saw carriage. The saw 38 is adapted to be clamped to the countershaft connection 50 to the shaft 42 when used for cross cutting work, or to be clamped by the connection 50 to the shaft 42 when used for ripping work during the travel of the platen as indicated by dotted lines in Fig. 3. The carriage is fed longitudinally for cross cutting work by means of a threaded nut 51 depending therefrom as shown in Fig. 4 and mounted upon the shaft 52 which is journaled in the support 23 and provided with a driving connection 53 as hereinafter described. The carriage is also provided with an indicator 54 which coöperates with a scale 55 slidably carried upon the support so that the lateral extent of travel may be positively determined as is desirable where the cut is and to be for a length less than the width of the stone.

Any desired driving connection may be used for the platen and saw carriage shafts, one form of which is here shown and comprises a motor 60 connected through the ordinary driving means 61 to effect high or low speed or a reversal of the driving shaft 62 which carries sprockets 63 and 64 with an intermediate clutch member 65 connected by an operating rod 66 with the lever 67. From the sprocket 63, a chain 68 extends to the driving connection 22 upon the shaft 20 for driving the platen. From the sprocket 64, a chain 69 extends to the driving connection 53 for feeding the saw carriage. It will be seen that the shifting of the clutch 65 effects either the feed of the platen or the feed of the saw carriage and permits an automatic operation by feeding the block to be sawed into proper position and then shifting the lever 67 to feed the saw 38 into contact with the side of the block adjacent thereto. The clutch members of the controlling mechanism shown at 61 are adapted to be actuated in the usual manner through the rods 70 and 71, the former of which is connected to a crank arm 72 carried by a sleeve 73 mounted upon the actuating rod 74 which carries the arm 75 connected to the rod 71. The sleeve 73 also carries an operating lever 76 secured thereto while the rod 74 is provided with a similar lever 77. The platen is provided with an indicating pointer 78 which coöperates with a scale 79 slidably mounted in brackets 80 carried by the base 10, as shown in Figs. 2 and 3.

In the operation of the invention, the stone cutting tool may be of any desired character and, when disposed upon the countershaft as shown by full lines in Figs. 1, 2 and 3, is adapted for cross cutting and jointing work upon the material carried by the platen. When so used, the platen is fed forward to the extent desired which may be determined by the coöperating scale and the saw carriage then actuated to produce the desired length of cut while the platen is at rest. The driving connections shown permit the intermittent operation of the platen and the feed of the saw carriage by actuating a single lever so that any movement of the platen is prevented when the cross cutting saw is in action. For the purpose of ripping or sawing material during the travel of the carriage, the saw is shifted to the main shaft extending from the motor and the proper speed of drive applied to the parts which is determined by the character of material operated upon and the type of cutting tool used. The saw carriage is also adjustable vertically so that any desired depth of cut may be made during the travel of the platen by the saw in its ripping action and a similar depth effected by the cross cut saw which renders the machine particularly adaptable for jointing work or where a section is cut from the body of the material operated upon. By altering the size of saw blade used, the machine is adapted for checking and by suitably blocking beneath the material cut, the variety of such checks may be extended. By slidably mounting the scales upon the base or support, they can be adjusted relative to the pointers upon the platen and saw carriage, so that the pointer may be set at zero after making a cut and will indicate, in the travel of the movable members, the exact distance required between cuts. The invention presents a simple, efficient and economically constructed machine adapted for many varieties of rip cutting during the travel of the platen or for cross cutting between the intermediate movements of the platen.

Having thus described my invention and set forth its merits, what I claim and desire to secure by Letters Patent is—

1. In a stone sawing machine, a movable platen, a saw carriage movable transversely of said platen, saw driving shafts mounted in the same horizontal plane upon said carriage and disposed at right angles to each other, and means for driving either said platen or carriage forward, said driving means being adapted to be shifted from one to the other by a single lever.

2. In a stone sawing machine, a movable platen, a saw carriage movable transversely thereof, a driving shaft extending longitudinally of said carriage and provided with a saw connection at its outer end, a countershaft extending at an angle from said driving shaft and geared thereto, said shafts being mounted in the same horizontal plane, a support upon which said carriage is mounted, collars mounted upon said support, raising shafts extending through said collars, and means for rotating said collars.

3. In a stone sawing machine, a movable platen, a saw carriage movable transversely thereof, a driving shaft extending longitudinally of said carriage and provided with a saw connection at its other end, a counter-shaft extending at an angle from said driving shaft and geared thereto, a support upon which said carriage is mounted, collars mounted in said support, raising shafts extending through said collars, means for rotating said collars, a base beneath said support upon which said shafts are mounted, and an extension from said support slidably disposed in said base.

4. In a stone sawing machine, a movable platen, a saw carriage movable transversely thereof, saw driving shafts mounted upon said carriage in the same horizontal plane, a support beneath said carriage, depending sleeves at the opposite ends of said carriage, a base adapted to slidably receive said sleeves, threaded shafts carried by said base, collars mounted upon said support to engage said shafts, and means for rotating said collars.

5. In a stone sawing machine, a movable platen, a saw carriage movable transversely thereof, a motor and saw driving shaft upon said carriage, a support beneath said carriage, depending sleeves at the opposite ends of said carriage, a base adapted to slidably receive said sleeves, threaded shafts carried by said base, collars mounted upon said support to engage said shaft, and means for rotating said collars.

6. In a stone sawing machine, a movable platen, a saw carriage movable transversely thereof, a motor and saw driving shaft upon said carriage, a support beneath said carriage, depending sleeves at the opposite ends of said carriage, a base adapted to slidably receive said sleeves, threaded shafts carried by said base, rotating collars mounted upon said support to engage said shafts, beveled gears carried by said collars, meshing beveled gears carried by said driving shafts, and a chain and sprocket connection between said driving shafts.

In testimony whereof I affix my signature in presence of two witnesses.

EDSON T. POLLARD.

Witnesses:
  GEO. C. COBB,
  WM. J. McGARRY.

---

Copies of this patent may be obtained for five cents each, by addressing the "Commissioner of Patents, Washington, D. C."